Oct. 8, 1957   A. R. A. BEEBER ET AL   2,809,142
MEASURING TAPES
Filed April 1, 1953
Fig. I
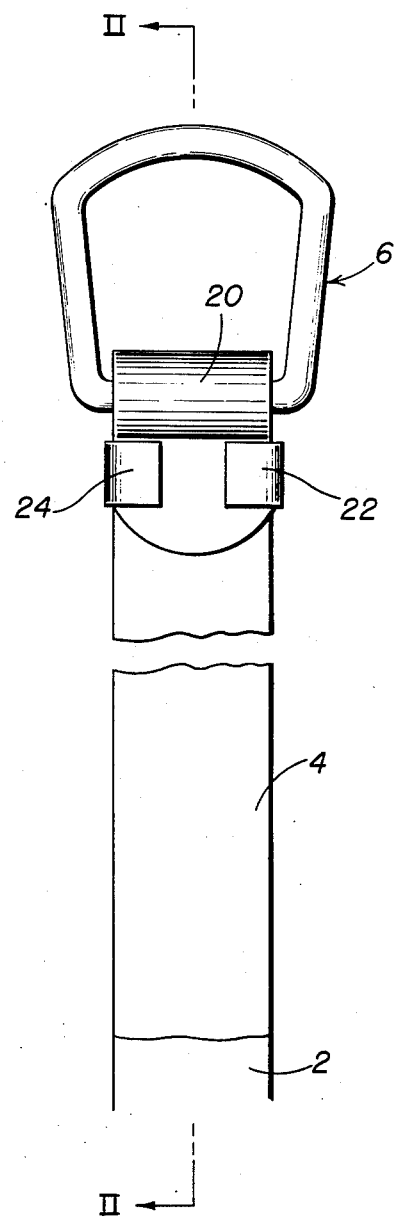
Fig. II
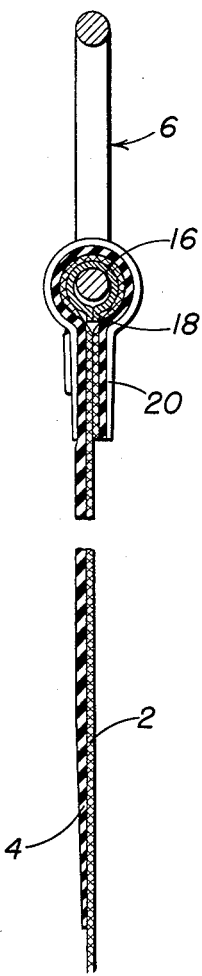
INVENTORS
ALLAN R. A. BEEBER
BY CARL R. SELLEN
ATTORNEY

United States Patent Office 2,809,142
Patented Oct. 8, 1957

2,809,142

MEASURING TAPES

Allan R. A. Beeber, Elizabeth, and Carl R. Sellen, North Bergen, N. J.

Application April 1, 1953, Serial No. 346,069

7 Claims. (Cl. 154—53.6)

This invention relates to a reenforcing end strip for woven measuring tapes. More specifically it relates to such a reenforcing strip which does not require the use of stitching.

Woven measuring tapes are provided with an end ring by means of which the zero end of the tape is held at one of the terminal points of measurement, the distance of the other terminal point of measurement being read on the tape. These end rings are usually of steel and it has long been recognized that the weakest part of the tape is at the end where it is joined to the metal end ring. For this reason, it has been common to sew a strip of leather or plastic material to the end of the tape which is joined to the end ring.

One type of woven measuring tape has glass fiber threads distributed throughout the warp pattern and these glass fibers are relied upon to increase the tensile strength and dimensional stability of the tape. The stitching of a strip of leather or plastic to a tape of this type or to any woven tape necessarily results in the breaking of some of the warp threads with a corresponding weakening of the tape. Another factor which has reduced the strength of these tapes near the end ring has been the use of a rivet through the tape in attaching the steel end ring, which rivet broke additional warp threads. This latter difficulty has been eliminated in the construction shown in copending patent application Serial No. 184,505 filed September 12, 1950, now Patent No. 2,648,114, issued August 11, 1953. In the construction shown in this copending application, an attempt has also been made to minimize the effect of stitching by only stitching along the edges of the tape.

Another disadvantage of the leather or plastic reenforcing strip is that a hinge point forms at the end of the reenforcing strip. During use of the tape a concentration of flexure stress continually develops at the end of this type of reenforcing strip and eventually the tape fails at this point. An attempt was also made to overcome this weakness in the construction shown in the above identified patent application by a diagonal cut at the end of the reenforcing strip. However, in practice this construction results in two hinge points where flexure stress concentrates, a major one at the acute angle and a minor one at the obtuse angle. The tape ultimately fails at one or the other of these hinge points.

The importance of the type of failure discussed above near the end ring of the woven measuring tapes will be readily appreciated when it is understood that such failures occur relatively early in the life of the tape while the greatest proportion of the length of the tape remains practically unworn. Thus the owner is obliged to discard 25 to 100 ft. or more of good tape because of the damaged end.

The principal object of the invention is to provide a more durable reenforcing means at the end ring in woven measuring tapes.

Another object of the invention is to provide a more gradual transition from the metal eye for the end ring in a woven measuring tape to the unsupported measuring tape strip.

Another object of the invention is to provide a reenforcing strip for a measuring tape which does not require weakening of the tape fabric by stitching.

Another object of the invention is to provide a more flexible reenforcing strip for the end of woven measuring tapes which will not form hinge points or concentration points for flexural stresses.

Another object of the invention is to provide a reenforcing end strip for woven measuring tape which is compressible and therefore permits the end ring attaching means to grip more firmly thereto.

These and other objects of the invention will be more fully understood by the following description taken in conjunction with the accompanying drawing, in which:

Fig. I is a view in plan showing the end of a measuring tape having an end ring attached and which is provided with a reenforcing end strip according to the present invention.

Fig. II is a view in sectional side elevation taken along the line II—II of Fig. I and looking in the direction of the arrows.

The invention is illustrated and described in conjunction with an end ring of the type disclosed in copending patent application Serial No. 184,505, filed September 12, 1950, and a woven fabric measuring tape of the type disclosed in copending patent application Serial No. 100,335, filed June 21, 1949, now Patent No. 2,659,153, issued November 17, 1953. However, it will be understood that the invention may be adapted for use with other end ring constructions and with other woven fabric measuring tape strips.

As more fully described in the copending application Serial No. 100,335, filed June 21, 1949, the end ring 6 is partially covered by a tubular member 16 provided with a projection 18. The measuring tape 2 provided with the reenforcing strip 4 passes through the ring 6 and covers the surface of the tubular member 16 and the end contacts the tape after passing through the ring 6. A sheet metal piece 20 passes through the ring 6 and covers the measuring tape 2. The metal piece 20 is bent to hold the tape 2 and reenforcing strip 4 rather tightly between itself and the tubular member 16. A pair of ears 22 and 24 are provided near one end of the metal strip 20 and are bent around the other end of the strip 20 to hold the doubled thickness of the measuring tape 2 and reenforcing strip 4 tightly together and compress them against the projection 18.

According to the present invention, the foamed plastic reenforcing strip 2 is of extremely flexible material having the consistency of soft sponge rubber bonded continuously to the surface of the measuring tape 4. Because of its flexible and compressible nature, the reenforcing strip may have greater thickness than the prior art leather or plastic strips. If used with the end ring construction shown, that portion of the reenforcing strip which lies under the metal strip 20 will be compressed and because of this compression the interaction of the tape 2 and strip 4 with the projection 18 on the sleeve 16 and the metal strip 20 will be increased so that the tape 2 is more securely joined to the end ring 6. The stiffness of the reenforcing strip is controlled to provide sufficient stiffness at the end of the metal strip 20 (otherwise this might become a hinge point or weak spot in the tape), but so as not to provide too great a change of stiffness at the end of the reenforcing strip 4 (for the same reason). Preferably, the reenforcing strip is thickest where it passes under the metal strip 20 and becomes progressively thinner finally blending in with the thickness of the tape 2 as shown. It is also preferred that the strength of the reenforcing strip should not be substantially greater than the strength of the bond between the reenforcing strip and the tape. Under these conditions, should the end of the strip become loosened from the tape a short portion of the strip will break away instead of the entire length of reenforcing strip being stripped away from the tape. In other words, the cohesion of the material forming the reenforcing strip should not be substantially greater than the adhesion of this material to the tape. Preferably, the adhesion is greater than the cohesion.

Any natural or synthetic foamed plastic material having the necessary flexibility, properties of adhesion and cohesion, etc., as described above will be useful in the present invention. However, it is preferred to use a plastigel material of the type described in the article "And now the 'Plastigels'" which appeared in the January 1952 issue of "Modern Plastics" magazine beginning at page 99. Additional information on plastigel materials is given in the article, "New vinyl foaming agent" which appeared in "Modern Plastics" for February 1952, page 87. Similar suitable materials are also known in the art as foam plastisols. The plastigels consist essentially of three components, a resin, a high proportion of a plasticizer and a gelling agent. Fillers, colorants and stabilizers may also be included. The resins, plasticizers and gelling agents described in the article referred to above are suitable. As pointed out in the article vinyl resins such as the "Vinylites" are particularly suitable. One example of a synthetic foamed plastic composition which may be used for making up the reenforcing strip according to the present invention is compounded according to the following formula:

| | Parts |
|---|---|
| "Vinylite QYNV" [1] (vinyl resin) | 100 |
| Dioctyl phthalate (plasticizer) | 60 |
| Bentone 34 [2] (gelling agent) | 1.5 |

[1] "Vinylite QYNV" is a vinyl resin product of the Bakelite Co.
[2] Bentone 34 is a product of the National Lead Company. It is an organic derivative of bentonite, an organophilic bentonite.

The proportions may be varied considerably in order to get suitable properties of flexibility, compressibility, adhesion and cohesion for a reenforcing strip used with a particular tape in combination with a particular end ring construction. In certain cases, the gelling agent may be omitted altogether, in which case the composition should more correctly be termed a plastisol rather than a plastigel. Fillers and colorants may be added to further improve desirable properties or as a means of identification. For example, green might be used to identify a completely non-conducting tape and red might be used to identify the so-called "metallic" woven tape which contains some metal strands. If no colorant or filler is used it is possible to obtain a clear transparent material (particularly if no gelling agent is used) which may be applied to the front of the measuring tape strip (over the markings) as well as to the back.

The foamed plastic composition may be applied directly to the tape in the form of a semi-liquid or paste-like material. Heat may then be used to set the material and bond it continuously to the tape. For example, a plastigel paste compounded according to the proportions tabulated above may be applied to the end portion of a tape of the type disclosed in copending application Serial No. 100,335, filed June 21, 1949, by coating from a roller which preferably turns against the direction of travel of the tape. By bringing the tape in contact with the roller gradually, the thickness of the coating will gradually increase to a maximum thickness near the free end of the tape. It will of course be understood that an excess of tape is provided at the zero end some of which is coated with the plastigel and which passes through the end ring and doubles back on itself. After adjustment of the graduations to the zero point of the end ring, the excess tape may be cut away so that if for example the end ring shown in copending application Serial No. 184,505, filed September 12, 1950, is used the tape with a heavy coating of plastigel will extend through the end ring 6 to the edge of the metal strip 20.

After coating the plastigel on the tape, the tape is heated at 300–340° F. for 3–5 minutes to puff-up and set the plastigel. Air need not be present during this heating step and if desired the tape might be immersed in a liquid while it is heated. The degree of puffing can be regulated by the degree of heat as well as by the proportion of gelling and/or puffing agent added in order to produce a reenforcing strip of the desired flexibility and cohesion for use with the particular measuring tape. If the tape is coated with a thermoplastic resin as the tape described in copending application Serial No. 100,335, filed June 21, 1949, the thermoplastic plastigel fuses directly to the thermoplastic resin coating forming an excellent bond of high adhesion. However, it will also bond to other types of coatings. Since the thermoplastic resins used in the tape covered by this copending application are of the vinyl type they form an excellent bond with vinyl resin plastigels. In fact, if the plastigel reenforcing strip is pulled away from the tape, the coating on the tape is pulled away from the fabric before the plastigel will separate from the coating. However, the plastigel is preferably heated sufficiently to puff the material and reduce the cohesion so that it will tend to pull apart before the coatings are pulled off the tape. The final maximum thickness of the reenforcing strip in this one preferred embodiment is about .080 of an inch at the end ring and this thickness reduces to about .015 of an inch at the end of the strip. The length of the reenforcing strip is usually between 6 inches and three feet, although even longer reenforcing strips can be used.

Other methods may be used for applying the plastigel onto the tape. For example, it may be extruded onto the tape and the excess removed with a doctor blade. It is also possible to precast the plastigel or other rubber-like strip and then apply it to the tape by an adhesive which produces sufficient adhesion to the tape.

Having thus described the invention, what is claimed is:

1. In a measuring tape comprising a woven fabric strip provided with coatings and measuring indicia and having an end ring, the improvement comprising a reenforcing end strip of extremely flexible foamed plastic material bonded continuously to the woven fabric measuring tape over a small fraction of the length of said tape near the end thereof provided with said end ring, said reenforcing end strip passing around said end ring.

2. In a measuring tape comprising a woven fabric strip provided with coatings and measuring indicia and having an end ring, the improvement comprising a reenforcing end strip of extremely flexible foamed plastic material bonded continuously to the woven fabric measuring tape over a small fraction of the length of said tape near the end thereof provided with said end ring, said reenforcing end strip passing around said end ring, the thickness of said reenforcing strip being a maximum where it passes around said end ring and reducing to a thinner minimum at the other end of said strip.

3. In a measuring tape comprising a woven fabric strip provided with coatings and measuring indicia and having an end ring, the improvement comprising a reenforcing end strip of foamed plastigel material bonded continuously to the woven fabric measuring tape over a small fraction of the length of said tape near the end thereof provided with said end ring, said reenforcing end strip passing around said end ring, the cross section of said reenforcing strip being a maximum where it passes around said end ring and reducing to a minimum at the other end of said strip.

4. In a measuring tape comprising a woven fabric strip provided with coatings and measuring indicia and having an end ring, the improvement comprising a reenforcing end strip of extremely flexible thermoplastic foamed plastic material fused continuously to the woven fabric measuring tape over a small fraction of the length of said tape near the end thereof provided with said end ring, said reenforcing end strip passing around said end ring, the cross section of said reenforcing strip being a maximum where it passes around said end ring and reducing to a minimum at the other end of said strip.

5. In a measuring tape comprising a woven fabric strip provided with coatings and measuring indicia and having an end ring, the improvement comprising a reenforcing end strip of extremely flexible foamed plastic material comprising a resin and a high proportion of plasticizer bonded continuously to the woven fabric measuring tape over a small fraction of the length of said tape near the end thereof provided with said end ring, said reenforcing end strip passing around said end ring, the cross section of said reenforcing strip being a maximum where it passes around said end ring and reducing to a minimum at the other end of said strip.

6. In a measuring tape comprising a woven fabric strip provided with coatings and measuring indicia and having an end ring, the improvement comprising a reenforcing end strip of plastigel material comprising a resin, a high proportion of a plasticizer and gelling agent puffed and bonded continuously to the woven fabric measuring tape over a small fraction of the length of said tape near the end thereof provided with said end ring, said reenforcing end strip passing around said end ring, the cross section of said reenforcing strip being a maximum where it passes around said end ring and reducing to a minimum at the other end of said strip.

7. In a measuring tape comprising a woven fabric strip provided with coatings and measuring indicia and having an end ring, the improvement comprising a reenforcing end strip of plastigel material comprising vinyl resin, a high proportion of a plasticizer and a gelling agent puffed and bonded continuously to the woven fabric measuring tape over a small fraction of the length of said tape near the end thereof provided with said end ring, said reenforcing end strip passing around said end ring, the cross section of said reenforcing strip being a maximum where it passes around said end ring and reducing to a minimum at the other end of said strip.

References Cited in the file of this patent

UNITED STATES PATENTS

| | | |
|---|---|---|
| 2,441,542 | Lawrence | May 11, 1948 |
| 2,447,056 | Cooper et al. | Aug. 17, 1948 |
| 2,618,580 | Lancaster | Nov. 18, 1952 |
| 2,648,114 | Holtz | Aug. 11, 1953 |
| 2,659,153 | Beeber | Nov. 17, 1953 |

FOREIGN PATENTS

| | | |
|---|---|---|
| 684,708 | Great Britain | Dec. 24, 1952 |